(12) United States Patent
Foresto et al.

(10) Patent No.: US 10,406,761 B2
(45) Date of Patent: Sep. 10, 2019

(54) METHOD FOR MANUFACTURING A PROPELLER BLADE

(71) Applicant: SNECMA, Paris (FR)

(72) Inventors: Paul Antoine Foresto, Moissy Cramayel (FR); Adrien Philippe Fabre, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 439 days.

(21) Appl. No.: 15/009,458

(22) Filed: Jan. 28, 2016

(65) Prior Publication Data
US 2016/0221273 A1    Aug. 4, 2016

(30) Foreign Application Priority Data
Jan. 29, 2015    (FR) ...................................... 15 50699

(51) Int. Cl.
*B29D 99/00* (2010.01)
*B29C 70/02* (2006.01)
(Continued)

(52) U.S. Cl.
CPC .......... *B29C 70/021* (2013.01); *B29C 33/046* (2013.01); *B29C 33/52* (2013.01);
(Continued)

(58) Field of Classification Search
CPC ......... B29C 70/10; B64C 11/22; B64C 11/24; B29D 99/0025; B29D 99/0028; F01D 5/18
(Continued)

(56) References Cited

U.S. PATENT DOCUMENTS 3,616,125 A * 10/1971 Bowling ................. F01D 5/184
                                                    416/229 A
4,507,051 A *  3/1985 Lesgourgues ........... B23P 15/04
                                                    416/213 R
(Continued)

FOREIGN PATENT DOCUMENTS

FR         2955609          7/2011

OTHER PUBLICATIONS

French Search Report and Written Opinion, dated Nov. 25, 2015, French Application No. 1550699.

*Primary Examiner* — Matthew J Daniels
*Assistant Examiner* — Andrew D Graham
(74) *Attorney, Agent, or Firm* — Womble Bond Dickinson (US) LLP (57) ABSTRACT

The invention relates to a method for manufacturing a blade made of composite material extending in a main elongation direction, the composite material of said blade comprising a fiber reinforcement densified by a matrix, the method comprising the following steps:
  a step of weaving warp yarns and weft yarns to produce a fiber preform, the fiber preform comprising at least one warp yarn adapted to form in the matrix at least one first portion of a channel, said portion of length of the warp yarn being directed according to the main elongation direction of the blade and opening at the root of the blade, the first channel portion formed in the matrix by said portion of length of warp yarn constituting at least one first portion of the internal airflow channel;
  a step of forming the fiber preform so as to produce a blade preform and densifying said blade preform;
characterized in that the weaving step comprises placing at least one second portion of yarn adapted to form in the matrix a second portion of a channel, said second portion of yarn being transversally directed relative to said main elon-
(Continued)

gation direction and opening at the trailing edge of the blade, the second channel portion formed in the matrix by said second portion of yarn constituting also at least one second portion of the internal airflow channel.

9 Claims, 12 Drawing Sheets (51) Int. Cl.
| | |
|---|---|
| F04D 29/68 | (2006.01) |
| B29C 70/48 | (2006.01) |
| B29C 70/68 | (2006.01) |
| B29C 70/86 | (2006.01) |
| B29C 33/52 | (2006.01) |
| B29C 70/24 | (2006.01) |
| F04D 29/32 | (2006.01) |
| B29C 45/00 | (2006.01) |
| B64C 11/26 | (2006.01) |
| B29C 33/04 | (2006.01) |
| B29L 31/08 | (2006.01) |

(52) U.S. Cl.
CPC .......... B29C 45/0005 (2013.01); B29C 70/24 (2013.01); B29C 70/48 (2013.01); B29C 70/682 (2013.01); B29C 70/86 (2013.01); B29D 99/0025 (2013.01); B64C 11/26 (2013.01); F04D 29/324 (2013.01); F04D 29/684 (2013.01); B29L 2031/08 (2013.01); F05D 2240/122 (2013.01); F05D 2300/603 (2013.01); F05D 2300/6034 (2013.01)

(58) Field of Classification Search
USPC ......... 442/205, 206, 207; 416/227 A, 227 R, 416/229 A, 232
See application file for complete search history.

(56) References Cited

U.S. PATENT DOCUMENTS

| | | | | |
|---|---|---|---|---|
| 5,403,153 A * | 4/1995 | Goetze | ................... | B29C 70/86 416/229 A |
| 5,484,642 A * | 1/1996 | Bompard | ................ | B29C 70/22 428/166 |
| 5,887,332 A * | 3/1999 | Champenois | ....... | B29C 37/0082 264/258 |
| 6,086,328 A * | 7/2000 | Lee | ........................... | F01D 5/18 415/115 |
| 6,837,687 B2 * | 1/2005 | Lee | ........................... | F01D 5/18 416/224 |
| 8,263,504 B2 * | 9/2012 | Bouillon | ................... | B32B 5/08 139/384 R |
| 8,499,450 B2 * | 8/2013 | Naik | ....................... | B29B 11/16 29/419.1 |
| 8,662,855 B2 * | 3/2014 | Naik | ....................... | F01D 5/147 416/230 |
| 8,846,147 B2 * | 9/2014 | Eberling-Fux | ....... | D03D 25/005 427/249.2 |
| 9,033,673 B2 * | 5/2015 | Roussille | ................ | F01D 5/147 416/229 A |
| 9,045,992 B2 * | 6/2015 | Roussille | ............. | D03D 25/005 |
| 9,062,562 B2 * | 6/2015 | Coupe | .................... | F01D 25/00 |
| 9,080,454 B2 * | 7/2015 | Coupe | .................... | B29C 70/222 |
| 9,616,629 B2 * | 4/2017 | Fabre | ...................... | B29C 70/24 |
| 2002/0076541 A1 * | 6/2002 | Jarmon | ................. | C04B 35/806 428/312.6 |
| 2005/0084377 A1 * | 4/2005 | Dambrine | ............... | B29C 70/48 416/223 R |
| 2006/0130957 A1 * | 6/2006 | Kostar | .................... | B28B 19/00 156/89.11 |
| 2006/0275132 A1 * | 12/2006 | McMillan | ............. | B29C 70/222 416/224 |
| 2007/0140835 A1 | 6/2007 | Albrecht et al. | | |
| 2008/0253898 A1 * | 10/2008 | Bauer | ....................... | F01D 5/16 416/232 |
| 2010/0144227 A1 * | 6/2010 | Coupe | ..................... | B29C 70/24 442/207 |
| 2011/0176927 A1 * | 7/2011 | Alexander | ................ | F01D 5/28 416/230 |
| 2011/0206531 A1 * | 8/2011 | Kroo | ..................... | F03D 1/0633 416/232 |
| 2011/0277869 A1 * | 11/2011 | Coupe | .................. | D03D 25/005 139/11 |
| 2011/0318513 A1 * | 12/2011 | Marsal | .................... | B29B 11/16 428/35.7 |
| 2012/0267039 A1 * | 10/2012 | Dambrine | ............... | B29C 70/48 156/148 |
| 2013/0017093 A1 * | 1/2013 | Coupe | ..................... | B64C 11/26 416/230 |
| 2013/0017094 A1 * | 1/2013 | Coupe | ..................... | B29C 70/24 416/230 |
| 2013/0089429 A1 * | 4/2013 | Nunez | ................... | C04B 35/571 416/230 |
| 2014/0030076 A1 * | 1/2014 | Nunez | ................... | F01D 5/282 415/183 |
| 2014/0072443 A1 * | 3/2014 | Mateo | ..................... | F01D 5/282 416/241 R |
| 2015/0226071 A1 * | 8/2015 | Marshall | ................ | F01D 5/282 416/230 |
| 2017/0122109 A1 * | 5/2017 | Bunker | ................... | F01D 25/14 |

* cited by examiner

METHOD FOR MANUFACTURING A PROPELLER BLADE

The present invention relates to a method for manufacturing a turboprop propeller blade of an aircraft.

More precisely, it relates to a method of weaving fibers for manufacturing a blade made of composite.

GENERAL TECHNICAL FIELD AND PRIOR ART

Current turboprops for aircraft, and more particularly turboprops for planes, encounter an interference problem between the propeller and the air input.

In fact, due to integration and mass restrictions these two components of the turboprop are very close to each other, for example of the order of a few centimeters. It is clear that operation of the air input is substantially impacted by passage of the blades as they rotate. The same applies for operation of the propeller which is very locally modified as it passes in front of the nacelle and the air input.

The role of the propeller is to provide a tractor force directed towards the front of the aircraft to have it compensate the drag force and move forwards.

The role of the air input on a turboprop is to supply the engine with air and protect it from external attack. For performance and operability reasons of the compressor, the air supply must be as homogeneous as possible to limit distortion (the difference between total average pressure and total minimum pressure). Integration of the air input must also be done by taking into account constraints particular to the turboprops, such as the presence of a Propeller Gear Box (or PGB), an engine-nacelle interface, a de-icing system and respect for ingestion constraints. Respecting these constraints causes an S-form of air input which is highly sensitive to distortion and disadvantageous to performance.

Because the blades pass in front of the air input during rotation of the propeller, this creates distortion perturbation in the air upstream of the air input, but also a drop in dynamic pressure, also called total pressure, (wake of blades). This drop impairs operation and performance of the air input by boosting load losses. Decrease of the performance of the air input directly impacts engine performance. The reduction in distortion increases operability of the turboprop compressor. Apart from wake of the blades, the propeller slightly compresses the flow to boost dynamic pressure. This compression has a beneficial effect on operation of the air input but this is attenuated by the negative effect of the slipstream of the blades.

So as to compensate the drop in total pressure in the slipstream of blades ingested by the air input, it is possible to make blades each comprising an internal airflow channel which comprises an input opening at the root of the blades and an output opening in the vicinity of the trailing edge of the blades such that an internal airflow can circulate from the root to the trailing edge of the blades, and that said internal airflow is expelled via the output of the internal airflow channel in the direction of the air input so as to reduce slipstream of the blades at the air input.

However, such a solution requires making an internal flow channel in each of the blades of the propeller comprising at least one output opening at the trailing edge of the blades.

Also, positioning the output of the internal airflow channel along the blades and the direction of the output of said internal airflow channel must be precise so that the airflow which is expelled via the output of said internal airflow channel can efficaciously reduce the slipstream of the blades at the air input.

Now, for mass gain reasons, the turboprop propeller blades for current aircraft are made of composite material, that is, composed of a fiber reinforcement densified by a matrix. Standard manufacturing methods of blades made of composite material do not create an internal airflow channel inside the blades.

However the known document FR 2 955 609 describes a method for manufacturing blades made of composite material by three dimensions Resin Transfer Molding (or 3D RTM) which comprise an airflow channel directed in the main elongation direction of the blades such that the internal airflow channel comprises an input opening at the root of the blades, and an output opening at the apex of the blades. However, the teaching of document FR 2 955 609 does not produce blades made of composite material each comprising an internal airflow channel which has an output opening in the vicinity of the trailing edge of the blades.

GENERAL PRESENTATION OF THE INVENTION

A general aim of the invention is to propose a method for fabricating a blade made of composite material which comprises an internal airflow channel comprising an input opening at the root of the blade and an output opening in the vicinity of the trailing edge of said blade.

Moreover, the invention produces such blades with a manufacturing method not needing substantial modification of the production machinery for fabrication of blades made of composite material.

More particularly, according to a first aspect, the invention relates to a method for manufacturing a blade made of 3D RTM composite material extending in a main elongation direction, said blade comprising a root, a trailing edge and at least one internal airflow channel, said blade being obtained from a fiber reinforcement densified by a matrix, the method comprising the following steps:

a step of weaving a plurality of warp yarns and a plurality of weft yarns so as to obtain a fiber preform, the fiber preform comprising at least one warp yarn adapted on at least one portion of its length to form in the matrix at least one first portion of a channel, said portion of length of the warp yarn being directed according to the main elongation direction of the blade and emerging from the root of the blade, the first channel portion formed in the matrix by said portion of length of warp yarn constituting at least one first portion of the internal airflow channel;

a step of forming the fiber preform so as to make a blade preform;

a densification step of the blade preform by impregnation of said blade preform by material constituting the matrix;

characterized in that the weaving step also comprises placing at least one second portion of yarn adapted to form in the matrix a second portion of a channel, said second portion of yarn being transversally directed relative to said main elongation direction of the blade and emerging from the trailing edge of the blade or from the vicinity of the latter, the second channel portion formed in the matrix by said second portion of yarn also constituting at least one second portion of the internal airflow channel.

According to an additional characteristic, the warp yarn adapted over at least one portion of its length to form in the matrix at least one first portion of a channel, and the second portion of yarn adapted to form in the matrix a second portion of a channel, are hollow fibers.

According to an additional characteristic, the warp yarn adapted on at least one portion of its length to form in the matrix at least one first portion of a channel, and the second portion of yarn adapted to form in the matrix a second portion of a channel, are fugitive fibers, said method comprising an elimination step by thermal or chemical treatment.

According to another characteristic, the second portion of yarn adapted to form in the matrix a second portion of a channel is a weft yarn which extends from a leading edge of the blade to the trailing edge, said weft yarn crossing with contact the portion of length of the warp yarn adapted to form a first channel portion such that the first and the second portions of the internal airflow channel open in each other and allow an airflow between each other.

According to a particular characteristic, the manufacturing method comprises a blocking step of the second portion of the internal airflow channel in the vicinity of the leading edge.

According to another characteristic, the blocking step is conducted by laying an anti-erosion polyurethane film, or laying a de-icing heating mat at the leading edge, or by injection of resin, or by injection of resin followed by laying a de-icing heating mat at the leading edge.

According to an additional characteristic, the warp yarn adapted on at least one portion of its length to form in the matrix at least one first portion of a channel comprises a non-woven free end with the weft yarns which is folded towards the trailing edge transversally relative to the main elongation direction of the blade, said free end being intended to form the second portion of the internal airflow channel transversally directed relative to said main elongation direction.

According to an additional characteristic, the free end is woven with the warp yarns.

According to a particular characteristic the free end is deposited on the surface of the fiber reinforcement without being woven.

According to another characteristic, a warp yarn intended to form a channel directed according to the main elongation direction and which extends from the root to a tip of the blade so as to form a first portion of the internal airflow channel, which opens at said tip of the blade.

According to a second aspect the invention relates to a blade made according to a manufacturing method according to one of the foregoing characteristics.

DESCRIPTION OF FIGURES

Other characteristics, aims and advantages of the present invention will emerge from the following detailed description and with respect to the appended drawings given by way of non-limiting examples and in which.

DESCRIPTION OF ONE OR MORE EMBODIMENTS

Figure 1:
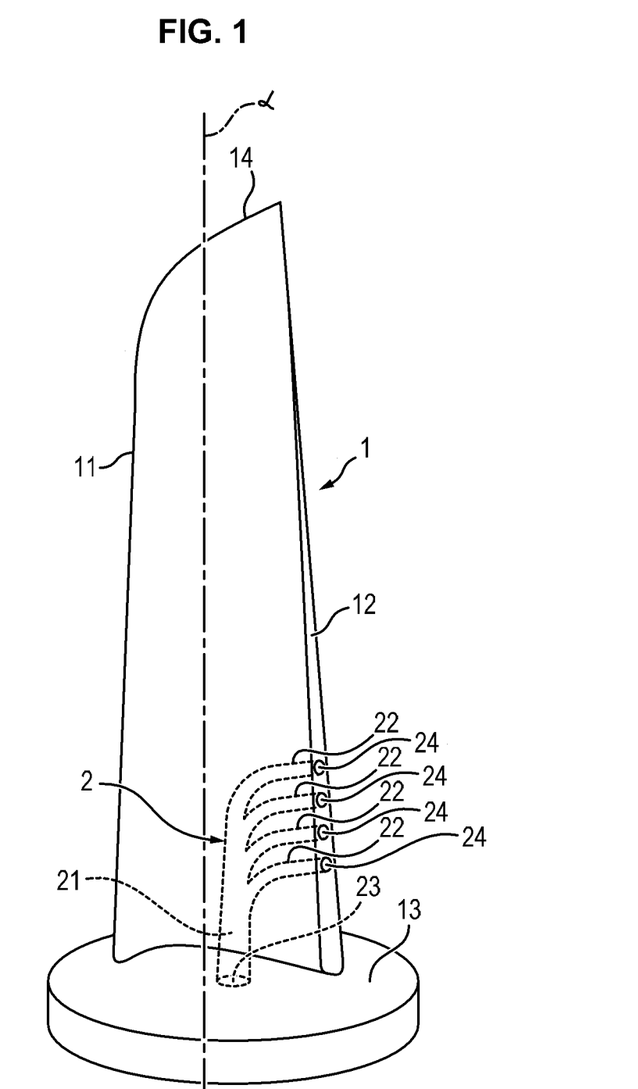
FIG. 1 illustrates a turboprop propeller blade which has been made by way of a manufacturing method according to the invention.

FIG. 1 shows a blade 1 of a propeller of a turboprop.

The blade 1 extends in a main elongation direction $\alpha$ and comprises a leading edge 11, a trailing edge 12, a root 13, an apex, a rayon, a tip 14, an intrados and an extrados. Tip 14 of the blade 1 means the surface of the apex of the blade 1 for which the blade 1 has its maximum radius. The blade 1 also comprises a skeleton line S which is constituted by the points located equidistant from the intrados and the extrados.

The blade 1 comprises an internal airflow channel 2 which extends inside said blade 1 from its root 13 towards the tip 14 of the blade 1.

The internal airflow channel 2 comprises at least one first portion 21 which extends from an input 23 opening at the back of the root 13, and which is directed according to the main elongation direction $\alpha$.

The internal airflow channel 2 also comprises at least one second portion 22 which is connected to at least one first portion 21, and which connects said first portion 21 to an output 24 which opens at the trailing edge 12 or in its immediate vicinity. Said second portion 22 is transversally directed relative to the main elongation direction $\alpha$ of the blade 1 being for example, but not necessarily, perpendicular to the general direction of the trailing edge 12.

In this way the internal airflow channel 2 opens of the blade 1 via one or more output(s) 24 which is (are) located at the trailing edge 12 and/or which is (are) located in its immediate vicinity.

In FIG. 1, the internal airflow channel 2 comprises a first portion 21, an input 23, four second portions 22 and four outputs 24, said four second portions 22 each being connected to the first portion 21. However, this is just one non-limiting example of the number of first and second input 23 outputs 24, portions 21 and 22.

The outputs 24 are arranged in an area of the trailing edge 12 likely to face an air input of the turboprop during rotation of the propeller. In this way, the outputs 24 are preferably located between 0% and 25% of the height of the blade 1. They are distributed there by being spaced uniformly relative to each other.

The blade 1 is made of composite material, comprising fiber reinforcement and a matrix, and all embodiments of the invention comprise the following steps which are the base steps for fabricating a blade made of composite material:
- a step of weaving a plurality of warp yarns 3 and weft yarns 4 so as to produce a fiber preform which constitutes the fiber reinforcement;
- a step of forming in a mold the fiber preform obtained in the preceding step so as to produce a blade preform whereof the form is close to the blade to be made;
- a densification step of the blade preform obtained in the preceding step by impregnation of the blade preform by material constituting the matrix.

The warp yarns 3 are yarns which are directed according to the main elongation direction α of the blade 1, and the weft yarns 4 are yarns which are directed orthogonally relative to the warp yarns 3 and which connect the leading edge 11 to the trailing edge 12.

The warp yarns 3 and the weft yarns 4 are generally made of carbon, but other materials can also be used.

Figure 13:
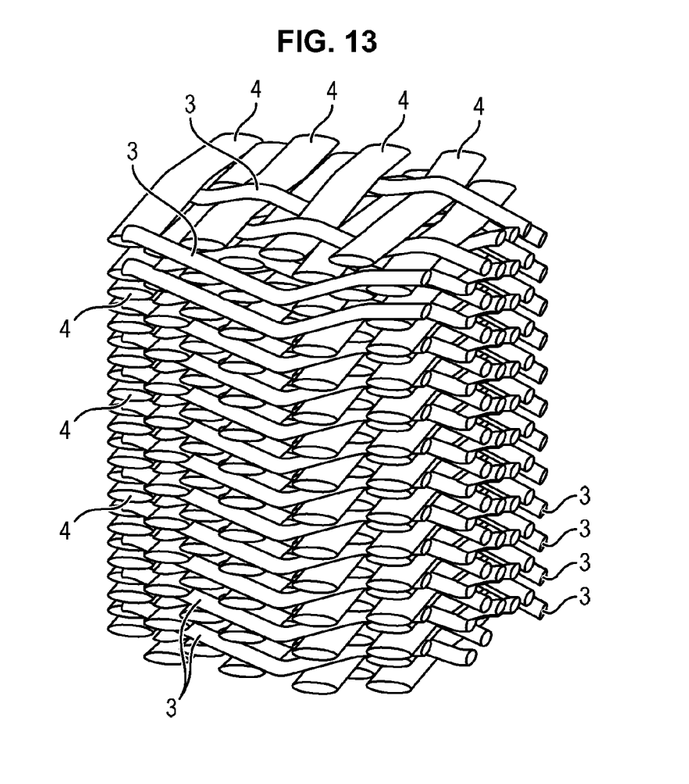
FIG. 13 illustrates an explanatory drawing of a three-dimensional weaving weave of interlock type.

The weaving of the warp yarns 3 and weft yarns 4 is preferably three-dimensional "interlock" weaving weave, as shown in FIG. 13. Here "interlock" weave means a weaving weave in which each layer of warp yarns 3 connects several layers of weft yarns 4 with all the yarns of the same weft column having the same movement in the weave plane. However, other weaves can be used.

Even more preferably, the fiber reinforcement is obtained by weaving with a 3D weave of "interlock" core type, and 2D or 3D weave of skin satin type. Reference could be made to document WO2006/136755 which discloses weaving fiber reinforcement according to such a technique.

For an example of fabrication of blades made of composite material with this type of technique, reference could also be made to document FR2955609 which especially proposes different possible variants concerning the weaving of yarns or the choice of materials.

Also, in the method for manufacturing the blade 1 the fiber preform comprises at least one warp yarn 31 adapted over at least one portion of its length to form in the matrix at least one first portion of a channel, said portion of length of the warp yarn 31 being directed according to the main elongation direction α of the blade 1 and ermerging from the root 13 of said blade 1. The first channel portion formed in the matrix by said portion of length of warp yarn 31 constitutes at least one first portion 21 of the internal airflow channel 2.

Finally, the weaving step also comprises placing at least one second portion of yarn adapted to form in the matrix a second portion of a channel, said second portion of yarn being transversally directed relative to said main elongation direction α and opening at the trailing edge 12 of the blade 1 or in the vicinity of the latter. The second channel portion formed in the matrix by said second portion of yarn also constitutes at least one second portion 22 of the internal airflow channel 2. The fact that the second portion of yarn constitutes at least one second portion 22 of the internal airflow channel 2 is ensured by the fact that said second portion of yarn is in contact with the portion of length of the warp yarn 31 adapted to form the first portion 21 of the airflow channel 2.

Figure 2:
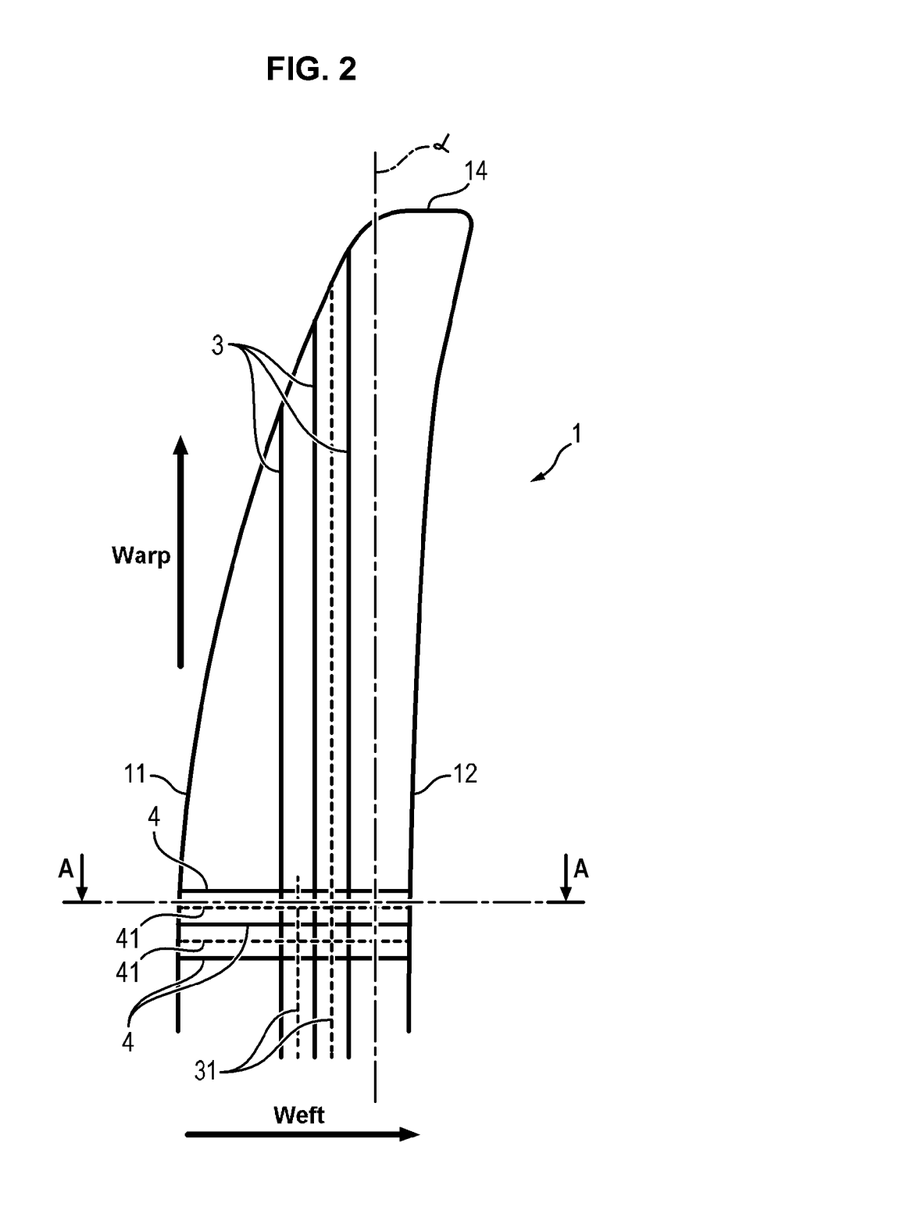
FIG. 2 illustrates an explanatory drawing of the weaving of yarns constituting the fiber reinforcement of a blade made according to a first embodiment of the invention.

As illustrated in FIG. 2, according to a first possible embodiment the manufacturing method comprises a step of positioning at least one warp yarn 31 adapted over its length to form in the matrix at least one first portion of a channel and at least one weft yarn 41 adapted over its length to form in the matrix a second portion of a channel so as to produce the internal airflow channel 2 inside the blade 1.

In this embodiment, the second portion of yarn adapted to form in the matrix a second portion of a channel is constituted by the weft yarn 41 which is adapted over its length to form in the matrix a second portion of a channel.

This warp yarn 31 and this weft yarn 41 are fugitive fibers which can be eliminated by appropriate treatment during an elimination step, for example chemical treatment or thermal treatment. The fugitive fibers can be made for example of polyvinyl acetate or polyethylene so they can be eliminated by thermal treatment. The fibers can also be polyvinyl alcohol (PVA) so they can be eliminated by chemical treatment. This warp yarn 31 and this weft yarn 41 can also be hollow fibers such that the manufacturing method needs no elimination step of the warp yarn 31 and the weft yarn 41.

In a possible embodiment, the method comprises a step in which at least one weft yarn 4 constituted in the base material (for example carbon) is replaced by a weft yarn 41 adapted to form a channel in the matrix. This weft yarn 41 adapted to form a channel in the matrix extends from the leading edge 11 to the trailing edge 12 and is positioned at a preferred height, preferably between 0% and 25% of the height of the blade 1. This weft yarn 41 adapted to form a channel is intended to form a second portion 22 of the internal airflow channel 2.

The method also comprises a step in which at least one warp yarn 3 is replaced by a warp yarn 31 adapted over its length to form a channel. This warp yarn 31 is woven with the weft yarns 4 from the part of the fiber reinforcement intended to form the root 13 of the blade 1 to a preferred height which is at least equal to the height at which a weft yarn 41 adapted over its length to form a channel is positioned such that said warp yarn 31 and said weft yarn 41 are in contact.

The warp yarn 31 and the weft yarn 41 can be woven with the weft yarns 4 and warp yarns 3 according to different weave or identical to the weave used to weave the warp yarns 3 and weft yarns 4.

As shown in FIG. 2, the fiber reinforcement comprises two warp yarns 31 adapted over their length to form channels and two weft yarns 41 adapted to form channels. The warp yarns 31 are woven over different lengths. The warp yarns 31 are in contact with a single weft yarn 41. However, according to a variant said warp yarns 31 can be in contact with several weft yarns 41.

Figure 3:
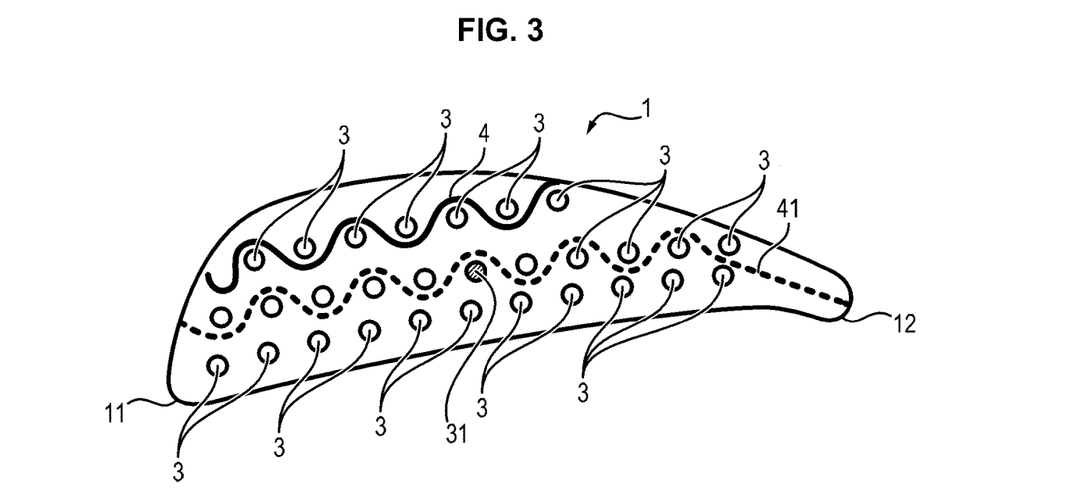
FIG. 3 illustrates a sectional view according to the axis AA of the explanatory drawing of FIG. 2 of a blade made according to a first variant of the first embodiment of the invention.
Figure 4:
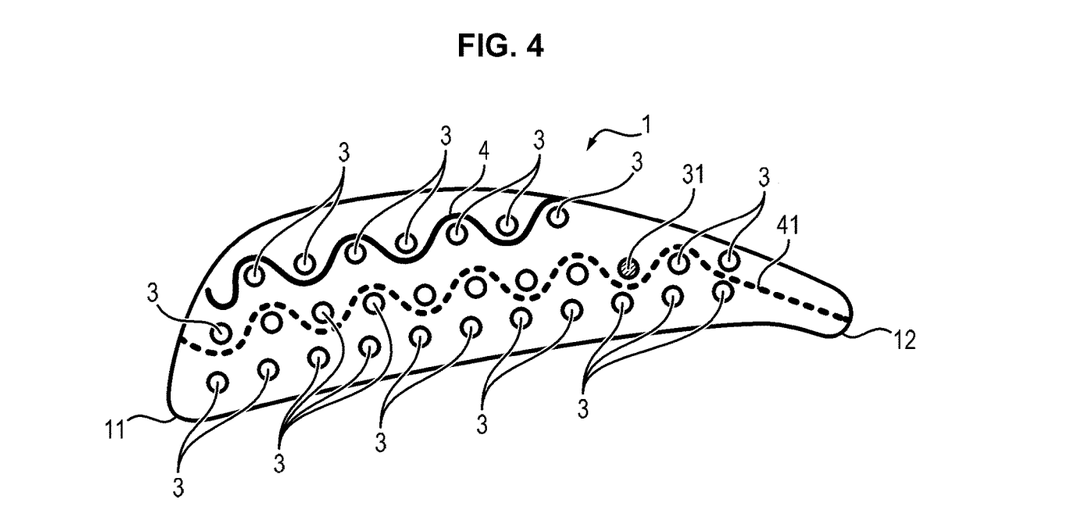
FIG. 4 illustrates a sectional view according to axis AA of the explanatory drawing of FIG. 2 of a blade made according to a second variant of the first embodiment of the invention.

FIGS. 3 and 4 schematically illustrate two variants of this embodiment.

According to the variant illustrated in FIG. 3, the warp yarn 31 is located at the center of the fiber reinforcement (and therefore at the center the blade 1). This variant ensures better mechanical performance of the blade 1 relative to the variant illustrated in FIG. 4 where said warp yarn 31 is located in a less central part of the blade 1 and therefore closer to the external surface of said blade 1.

In general, in all embodiments, it is preferable to position the warp yarns 31 and the weft yarns 41 at the center of the fiber reinforcement such that the resulting portions of channel are located at the center of the blade 1.

Figure 5:
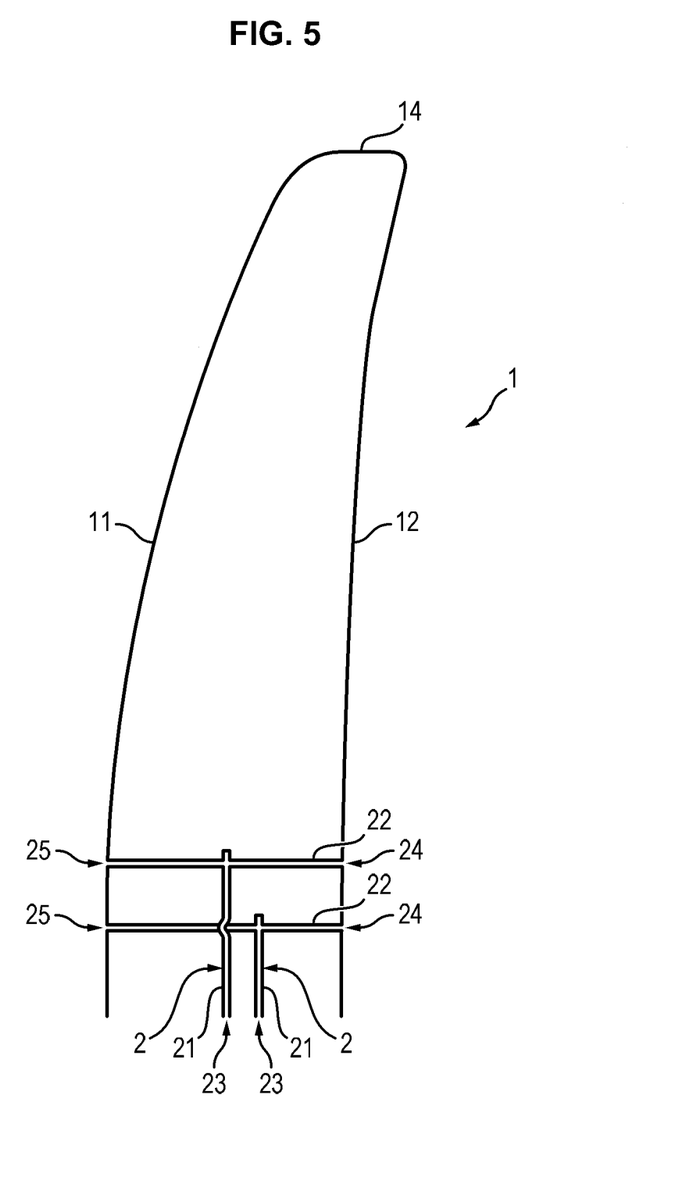
FIG. 5 illustrates an explanatory drawing of the position of the internal airflow channel in the blade made according to the first embodiment of the invention.

As illustrated in FIG. 5, following the densification step of the blade preform and the potential elimination step of warp yarns 31 and weft yarns 41, the blade 1 is formed and comprises an internal airflow channel 2 which opens at the root 13, the trailing edge 12 of the blade 1 or in the vicinity of the latter, and the leading edge 11 or in the vicinity of the latter. The fact that the internal airflow channel 2 opens at the leading edge 11, or in the vicinity of it, can cause degradation of performance of the blade 1, as well as possible risk of obstruction by foreign bodies during operation of the turboprop. So, the method comprises a blocking step at the leading edge 11 of the internal airflow channel 2. This blocking step can be for example conducted by laying an anti-erosion polyurethane film, by laying a de-icing heating mat at the leading edge 11, or else by injection of resin. It is also possible to inject resin and lay a heating map at the leading edge 11.

Figure 6:
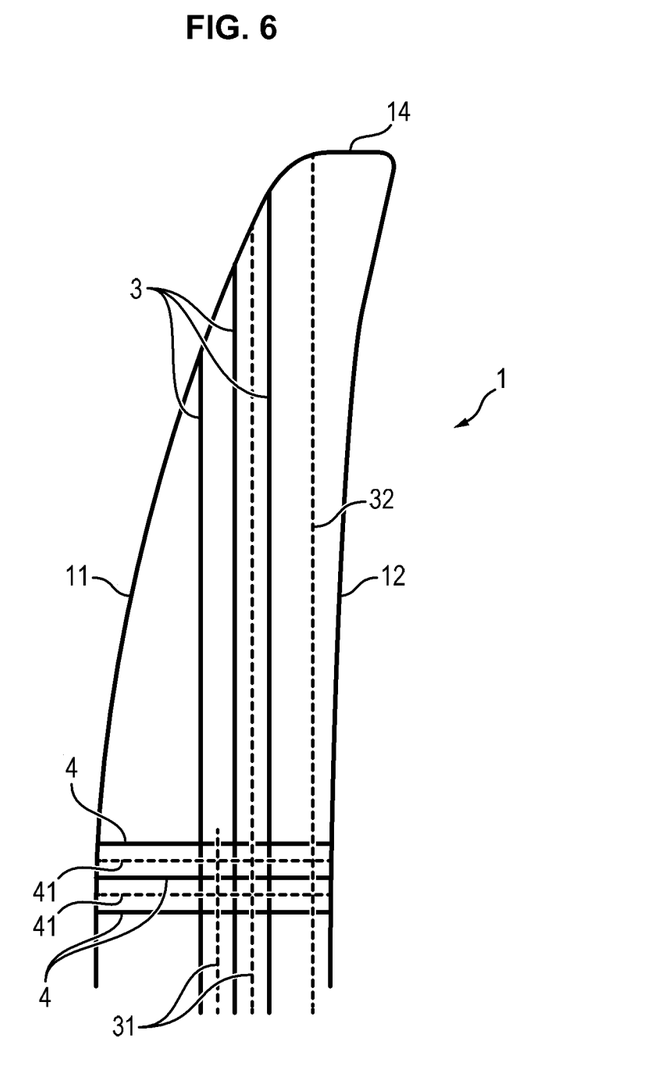
FIG. 6 illustrates an explanatory drawing of the weaving of yarns constituting the fiber reinforcement of a blade made according to a second embodiment of the invention.
Figure 7:
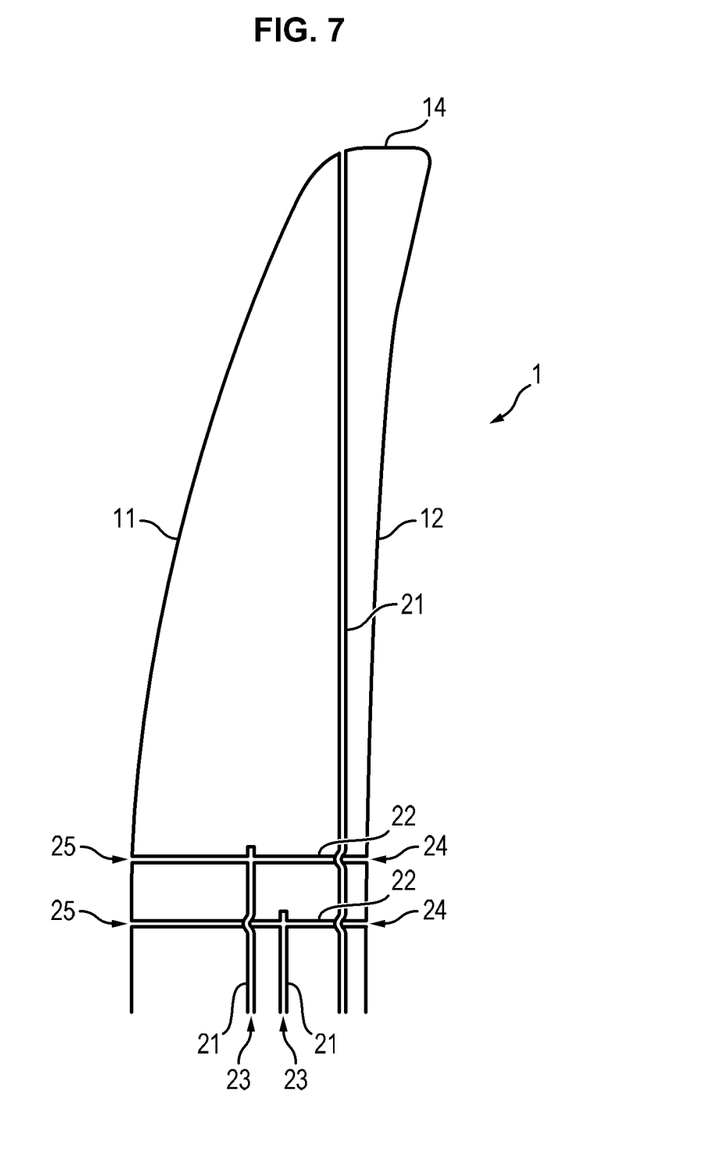
FIG. 7 illustrates an explanatory drawing of the position of the internal airflow channel in the blade made according to the second embodiment of the invention.

According to a second possible embodiment, and as illustrated in FIGS. 6 and 7, the manufacturing method can comprise a step of positioning a warp yarn intended to form a channel 32 which is woven from that part of the fiber reinforcement intended to form the root 13 of the blade 1, including that part of the fiber reinforcement intended to form the tip 14 of the blade 1. Such a step forms a first portion 21 of the internal airflow channel 2 which opens at the tip 14 of the blade 1. The fact that the internal airflow channel 2 opens at the tip 14 allows airflow to be ejected by said tip 14, which improves the aerodynamic performance of the turboprop.

The warp yarn intended to form a channel 32 can be in contact with one or more weft yarns 41, or else not be in contact with said weft yarns 41. Also, according to a variant, a warp yarn 31 adapted over its length to form in the matrix a first portion of a channel can be woven from the root 13 to the tip 14 such that the internal airflow channel 2 opens in the vicinity of the tip 14.

According to yet a third embodiment (FIGS. 8 to 11), the method for manufacturing the blade 1 can include no step of positioning a weft yarn 41 adapted over its length to form in the matrix a second portion of a channel.

Figure 8:
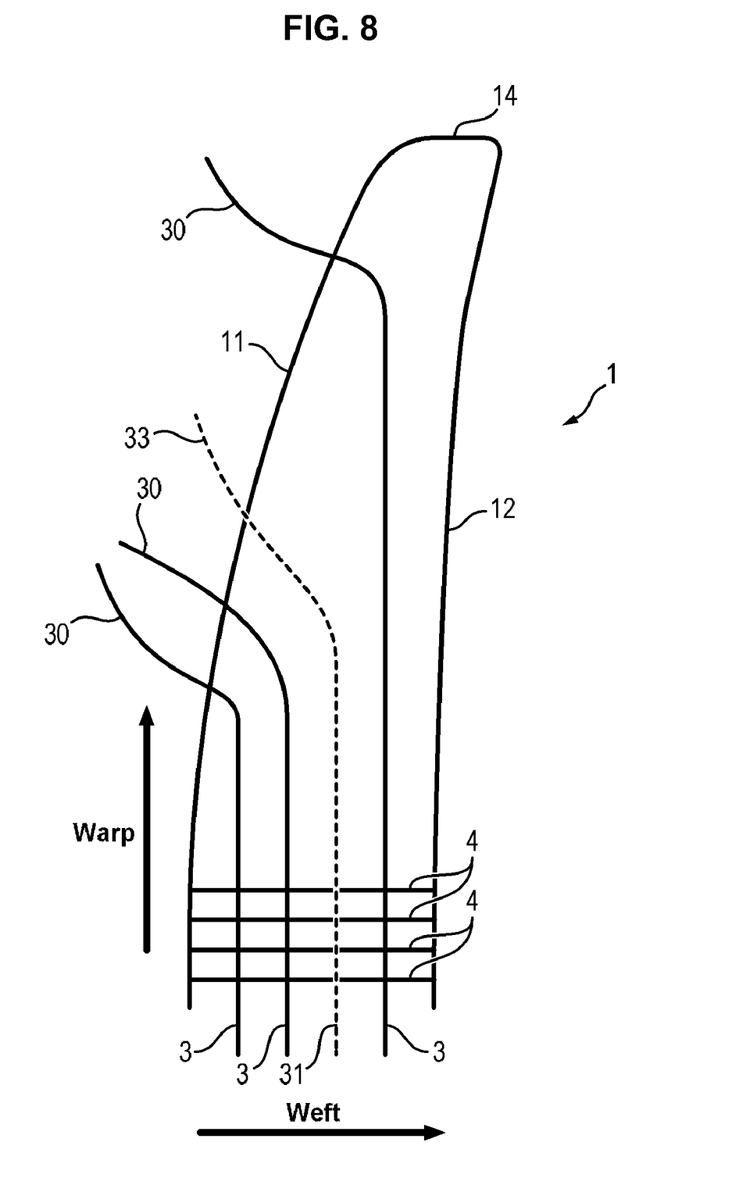
FIG. 8 illustrates an explanatory drawing of the weaving of yarns constituting the fiber reinforcement of a blade made according to a third embodiment of the invention.

To control the thickness of the fiber reinforcement (and therefore of the blade 1), layers of fibers are stacked whereof the length on which the warp yarns 3 and the weft yarns 4 are woven is controlled. So, as illustrated in FIG. 8, the warp yarns 4 comprise a non-woven free end 30 which is intended to be cut.

Figure 9:
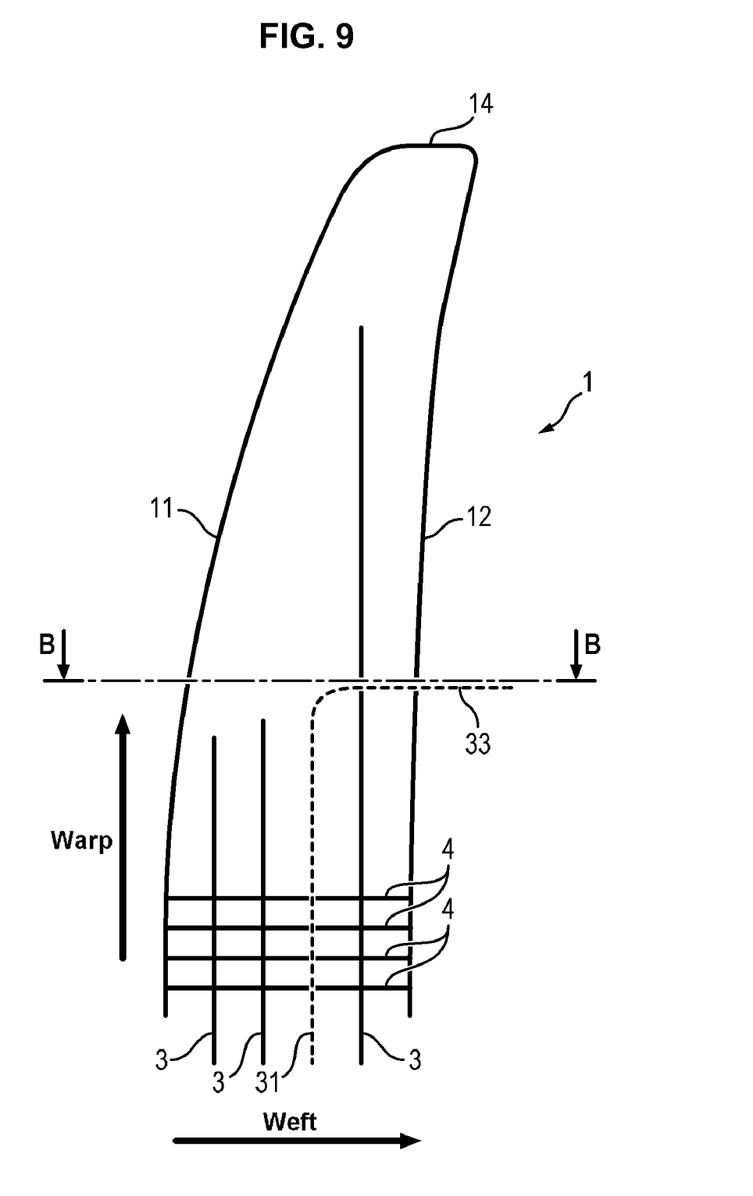
FIG. 9 illustrates an explanatory drawing of the step of positioning a warp yarn which is intended to form a channel according to the third embodiment of the invention.

A manufacturing method according to this third embodiment can for example comprise a step of positioning at least one warp yarn 31 adapted over at least one portion of its length to form in the matrix a first portion of a channel by replacing a warp yarn 3 constituted in the base material by a said warp yarn 31. This warp yarn 31 is positioned in a layer whereof the warp yarns 3 are not woven integrally, and comprises therefore a non-woven free end 33 with the weft yarns 4 which is intended to be cut. As illustrated in FIG. 9, this free end 33 is folded in the direction of the trailing edge 12 transversally relative to the main elongation direction α of the blade 1, such that said warp yarn 31 is folded in an L-shape and the free end 33 is adapted to form the second portion 22 of the internal airflow channel 2.

Figure 10:
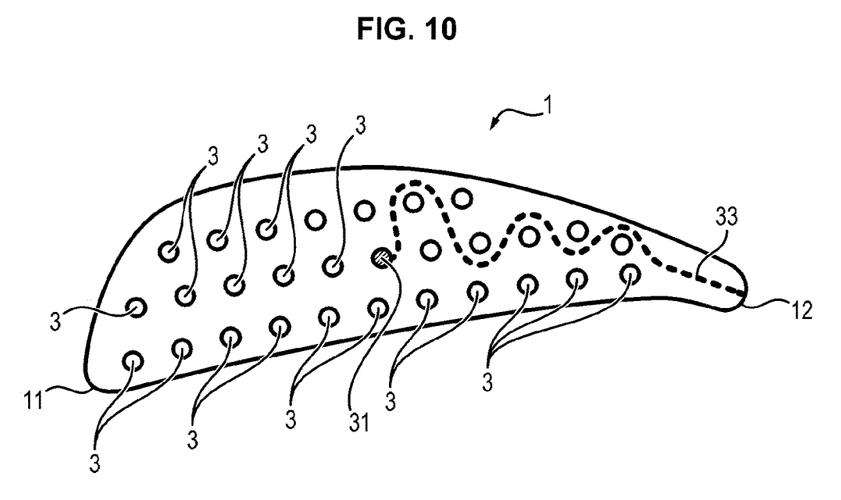
FIG. 10 illustrates a sectional view according to axis BB of the explanatory drawing of FIG. 9 of a blade made according to a first variant of the third embodiment of the invention.
Figure 11:
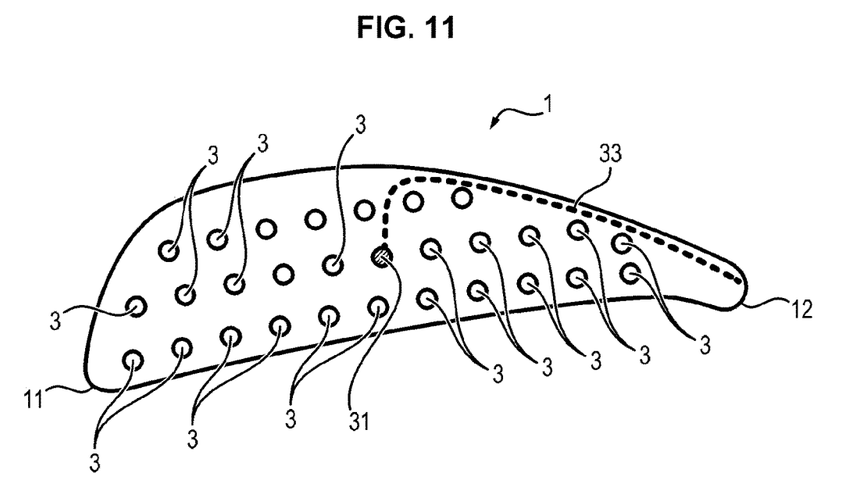
FIG. 11 illustrates a sectional view according to axis BB of the explanatory drawing of FIG. 9 of a blade made according to a second variant of the third embodiment of the invention.

As illustrated in FIGS. 10 and 11, the free end 33 of the warp yarn 31 which is folded back can be either woven with the warp yarns 3 or deposited on the surface of the fiber reinforcement. When the free end 33 of the warp yarn 31 is woven with the warp yarns 3, it can be woven according to interlock weave or else according to other possible weaves. In this execution, the second portion of yarn adapted to form in the matrix a second portion of a channel is constituted by the free end 33 of the warp yarn 31 which is adapted over its length to form in the matrix a second portion of a channel.

Figure 12:
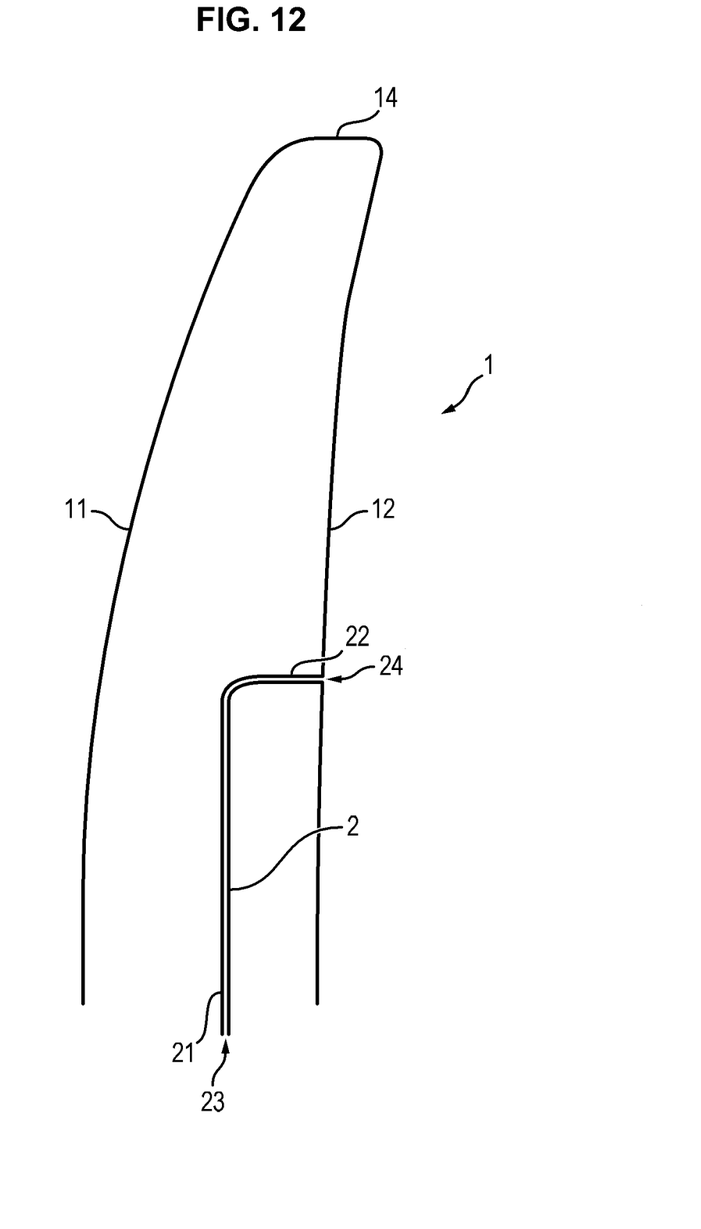
FIG. 12 illustrates an explanatory drawing of the position of the internal airflow channel in the blade made according to the third embodiment of the invention.

According to a variant of this embodiment, the method can comprise a step of positioning a warp yarn intended to form a channel 32 directed according to the main elongation direction α which extends from the root 13 to the level tip 14 of the blade 1 so as to form a first portion 21 of the internal airflow channel 2 which extends of the root 13 au tip 14, and which opens au root 13 and at the tip 14.

To control the direction of the output 24 of the internal airflow channel 2, it is possible to control an angle β created by the axis of said output 24 and a skeleton line S of the blade 1 at the trailing edge 12. In fact, the skeleton line S is a parameter which is determined by the profile of the blade 1, and which directly influences the slipstream of the blade 1.

This angle β is controlled by adapting the weave with which the weft yarn 41 or else the free end 33 is woven with the warp yarns 3.

Figure 14:
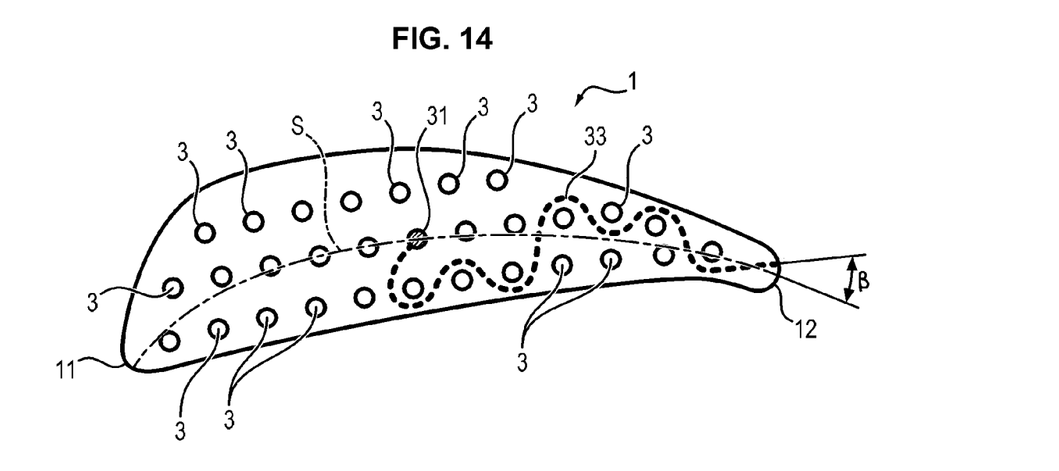
FIG. 14 illustrates a first explanatory drawing of the control of the direction of the input of the internal airflow channel.
Figure 15:
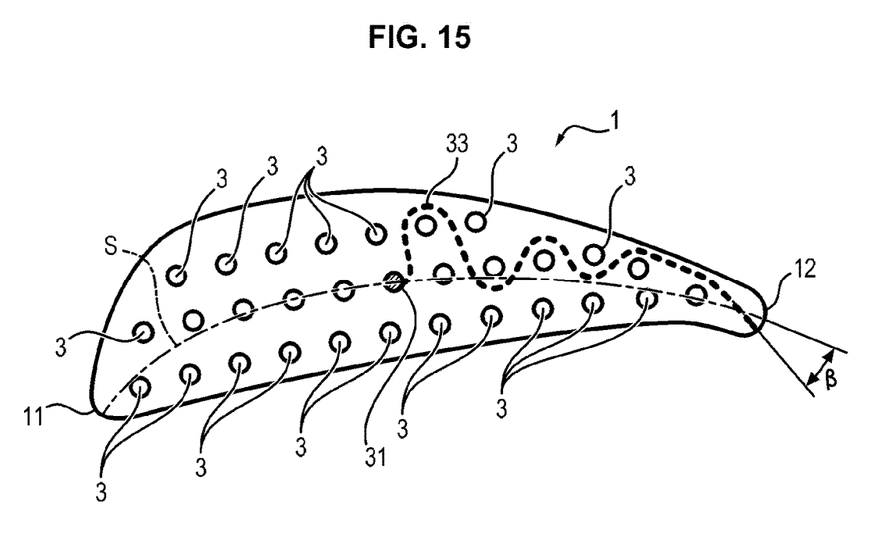
FIG. 15 illustrates a second explanatory drawing of the control of the direction of the input of the internal airflow channel.

In fact, as evident in FIGS. 14 and 15, it is clear that the weave used for weaving directly influences the direction of the free end 33 of the warp yarn 31 which will form the output 24. The output 24 is formed by the free end 33 of a warp yarn 31. However, it is also possible to control the angle β between the skeleton line S and the axis of the output 24 by adapting the weave in the case of weaving a weft yarn 41 adapted to form a channel in the first and second embodiments of the invention.

In the event where the second portion of yarn adapted to form in the matrix a second portion of a channel (for example a weft yarn 41 adapted over its length to form a channel, or a free end 33 of a warp yarn 31 adapted over its length to form a channel) is not woven and is deposited only on the surface of the fiber reinforcement, the angle β can easily be determined as said second portion of yarn adapted to form in the matrix a second portion of a channel will be directed according to the intrados or the extrados of the blade 1, according the face of the fiber reinforcement on which it is deposited.

To increase the diameter of the internal airflow channel, it is possible for any embodiment of the invention to use several warp yarns 31 and/or several weft yarns 41 by juxtaposing them so as to augment the diameter of the channel created by elimination of said warp 31 and/or weft 41 yarns.

In the event where the warp 31 and/or weft 41 yarns are hollow fibers, it is possible to increase the diameter of the fibers to increase the diameter of the resulting channels.

The invention claimed is:

1. A method for manufacturing a blade made of composite material extending in a main elongation direction, said blade comprising a root, a trailing edge and at least one internal airflow channel, the composite material of said blade comprising a fiber reinforcement densified by a matrix, the method comprising the following steps:
   a step of weaving a plurality of warp yarns and a plurality of weft yarns so as to obtain a fiber preform, the fiber preform comprising at least one warp yarn adapted over at least one portion of its length to form in the matrix at least one first portion of a channel, said portion of length of the warp yarn being directed according to the main elongation direction of the blade and emerging from the root of the blade, the first channel portion formed in the matrix by said portion of length of warp yarn constituting at least one first portion of the internal airflow channel;

a densification step of the blade preform by impregnation of said blade preform by material constituting the matrix;

wherein the weaving step also comprises placing at least one second portion of yarn adapted to form in the matrix a second portion of a channel, said second portion of yarn being transversally directed relative to said main elongation direction ($\alpha$) and emerging from the trailing edge of the blade, said second portion of yarn being in contact with the portion of length of warp yarn and being a weft yarn which extends from a leading edge of the blade to the trailing edge, said weft yarn crossing with contact the portion of length of the warp yarn adapted to form a first channel portion such that the first and the second portions of the internal airflow channel open in each other by way of contact between said yarns, allowing circulation of an airflow from the root to the trailing edge.

2. The method according to claim 1, wherein the warp yarn adapted to form at least one first portion of a channel, and the second portion of yarn adapted to form a second portion of a channel are hollow fibers.

3. The method according to claim 1, wherein the warp yarn adapted over at least one portion of its length to form in the matrix at least one first portion of a channel, and the second portion of yarn adapted to form in the matrix a second portion of a channel are fugitive fibers, said method comprising an elimination step by thermal or chemical treatment.

4. The method according to claim 1, further comprising a blocking step of the second portion of the internal airflow channel on the leading edge side.

5. The method according to claim 4, wherein the blocking step is conducted by laying an antierosion polyurethane film, or laying a de-icing heating mat at the leading edge, or by injection of resin, or by injection of resin followed by laying a de-icing heating mat at the leading edge.

6. A method for manufacturing a blade made of composite material extending in a main elongation direction, said blade comprising a root, a trailing edge and at least one internal airflow channel, the composite material of said blade comprising a fiber reinforcement densified by a matrix, the method comprising the following steps:

a step of weaving a plurality of warp yarns and a plurality of weft yarns so as to obtain a fiber preform, the fiber preform comprising at least one warp yarn adapted over at least one portion of its length to form in the matrix at least one first portion of a channel, said portion of length of the warp yarn being directed according to the main elongation direction of the blade and emerging from the root of the blade, the first channel portion formed in the matrix by said portion of length of warp yarn constituting at least one first portion of the internal airflow channel;

a densification step of the blade preform by impregnation of said blade preform by material constituting the matrix;

wherein the weaving step also comprises placing at least one second portion of yarn adapted to form in the matrix a second portion of a channel, said second portion of yarn being transversally directed relative to said main elongation direction ($\alpha$) and emerging from the trailing edge of the blade, said second portion of yarn being in contact with the portion of length of warp yarn, the warp yarn being adapted over at least one portion of its length to form in the matrix at least one first portion of a channel comprises a non-woven free end which is folded towards the trailing edge transversally relative to the main elongation direction of the blade, said free end being intended to form the second portion of the internal airflow channel transversally directed relative to said main elongation direction.

7. The method according to claim 6, characterized in that the free end is woven with the warp yarns.

8. The method according to claim 6, characterized in that the free end is deposited on the surface of the fiber reinforcement without being woven.

9. The method according to claim 1, characterized in that a warp yarn intended to form a channel directed according to the main elongation direction, extends from the root to a tip of the blade so as to form a first portion of the internal airflow channel which opens at said tip of the blade.

* * * * *